United States Patent Office 3,220,824
Patented Nov. 30, 1965

3,220,824
PROCESS FOR MAKING A MIXED FERTIL-
IZER CONTAINING UREA-FORMALDEHYDE
POLYMER
Robert J. Church, Brandywood, Wilmington, Del., assignor to E. I. du Pont de Nemours and Company, Wilmington, Del., a corporation of Delaware
No Drawing. Filed July 24, 1963, Ser. No. 297,229
4 Claims. (Cl. 71—28)

This application is a continuation-in-part of my application Serial No. 183,761 filed March 30, 1962, now abandoned.

This invention relates to an improved process for the preparation of mixed fertilizers having high quality urea-formaldehyde nitrogen content.

It is well recognized in the fertilizer art that in mixed fertilizers, i.e., those which contain normal- or triple-superphosphates and conventional compounds such as ammonium sulfate, potassium chloride or potassium sulfate, it is desirable to have some of the nitrogen present as urea-formaldehyde nitrogen so that the fertilizer will supply nitrogen to plants slowly and over a long period of time. The rate of nitrification by the urea-formaldehyde is defined as its activity index (AI) which, in effect, is a measure of its agronomic quality. To be of value as a nitrifying agent, according to the Association of American Fertilizer Control Officials, the AI of urea-formaldehyde must be at least 40. Below this value urea-formaldehyde is of poor agronomic quality.

The urea-formaldehyde nitrogen can be added to a mixed fertilizer in two basic ways, well known in the art. The first and usual method is to form the urea-formaldehyde nitrogen in situ on phosphatic substrates by adding an ammoniating solution containing urea, ammonia and a source of formaldehyde (hereafter called "ammoniating solution") to the dry fertilizer ingredients under carefully controlled conditions of time, temperature and pH. The urea-formaldehyde thus formed in situ is of high agronomic quality having an AI in excess of 40. Under optimum conditions and by using sulfuric or phosphoric acid to tie up the ammonia which remains unreacted with the phosphatic substrate, it is only possible by this method to add about 20% of the total nitrogen of the fertilizer as urea-formaldehyde nitrogen.

Generally speaking, a urea-formaldehyde nitrogen content of this magnitude is unsatisfactory to most fertilizer manufacturers, and to increase the amount of urea-formaldehyde nitrogen in the fertilizer, a conventional fertilizer grade solid urea-formaldehyde polymer, the AI of which is at least 40 is added to bring the amount of urea-formaldehyde nitrogen to the desired level.

Combinations of the two methods give fertilizer manufacturers maximum flexibility in formulating their products. It has been observed, however, that when sulfuric or phosphoric acid is added to dry fertilizer ingredients which also contain a solid urea-formaldehyde polymer as a source of urea-formaldehyde nitrogen, the quality of the polymer, in terms of its AI, is degraded. In other words, the very conditions which are optimum for developing the maximum amount of urea-formaldehyde nitrogen from an ammoniating solution, promote the degradation of the solid urea-formaldehyde polymer contained in the dry fertilizer ingredients such that its AI is reduced to a value below 40.

It has now been found that this problem is overcome by premixing the ammoniating solution and the sulfuric or phosphoric acid at a pH above 6, and then feeding this partially neutralized solution into a mixer containing the conventional solid fertilizer ingredients and the solid urea-formaldehyde polymer. In this way, degradation of the solid urea-formaldehyde polymer is avoided, and yet conditions are at an optimum for the production of urea-formaldehyde nitrogen from the ammoniating solution.

According to this invention, the ammoniating solution and acid are first mixed in such proportions that when sulfuric acid is used, the pH in the mixing area is kept at above 6.8, and below 11, and when phosphoric acid is used the pH range is maintained at 6–6.5. The pH is regulated in these ranges by controlling the amounts of solutions fed into the reaction zone.

The mixing can be done in any conventional apparatus which will ensure complete co-mingling of the solutions, but must be done in a closed container since it is essential that free ammonia be kept in solution. If ammonia is allowed to escape from the reaction zone, it of course becomes difficult to control the pH, to say nothing of the expense engendered.

In a preferred embodiment, the acid and ammoniating solution are mixed in a mixing "T." In such an arrangement, the acid is fed into one leg of the "T" and the ammoniating solution is fed into another, both at predetermined rates. The turbulent streams created by feeding these two separate streams into the "T" mix the solutions completely. The mixed, reacted solution is then withdrawn from the third leg of the "T" and fed into the mixer containing the solid fertilizer ingredients including a solid urea-formaldehyde polymer.

The pH of the dry fertilizer ingredients after the addition of the premixed acid-ammoniating solution must be in the range of 5.2 to 6.2, preferably 5.5 to 6.2. This is necessary to ensure the proper development of urea-formaldehyde nitrogen from the ammoniating solution and to maintain the high activity index of the solid urea-formaldehyde polymer. The pH is maintained within this range by proper formulation of the dry ingredients and can easily be done by those skilled in the art using conventional techniques.

Mixed fertilizers prepared according to this invention can contain as much as 20% to 61% of urea-formaldehyde nitrogen, 5% to 20% of this being derived from the ammoniating solution and the remainder supplied as a solid urea-formaldehyde polymer.

The process of this invention will benefit the maker of mixed fertilizers by giving maximum flexibility as to amount of urea-formaldehyde nitrogen present, at a minimum cost. This is accomplished by making it possible for him to obtain a maximum amount of urea-formaldehyde nitrogen from an ammoniating solution under conditions which also preserve the AI of the solid urea-formaldehyde polymer present. All this is done with simple equipment.

The process has the added advantage of forming about ¾ of the urea-formaldehyde nitrogen from the ammoniating solution immediately. There is no need for curing and the product can be bagged and sold immediately after preparation.

This invention will be better understood and more easily practiced by referring to the following illustrative examples:

*Example 1*

A 10–6–4-grade fertilizer is prepared by continuously metering 643 pounds of normal superphosphate (20% $P_2O_5$, 6% $H_2O$), 136 pounds of muriate of potash (60% $K_2O$), 597 pounds of dolomite, 37 pounds of trace element compounds, and 185 pounds of a solid ureaform fertilizer, AI 42.5, into a T.V.A. ammoniator 14 feet long and 7 feet in diameter, at a rate of 20 tons per hour. This mixture is continuously rotated.

A mixing "T" is mounted inside the ammoniator on the inlet side. Four hundred pounds of an ammoniating solution consisting of about 35.3% urea, 8% formaldehyde, 25% ammonia, 23.3% water and 8.4% $CO_2$ are continuously fed into one leg of the "T." Into the other leg are fed 260 pounds of sulfuric acid. The pH in the reaction zone is maintained at about 7 by regulating the flow of the solutions.

This mixed, reacted solution is then continuously fed from the third leg of the "T" into the ammoniator, and thoroughly mixed with the solids ingredients. The residence time of the solids in the mixer is approximately 5 minutes.

The fertilizer is then discharged from the mixer into a continuous drier and is dried at below 200° F. for no longer than 15 minutes. The product is screened to about +10-20 mesh and then fed into a continuous rotary cooler where it is cooled to approximately 100° F. The fertilizer is then stored in the normal manner.

A determination of the activity index (AI) of the urea-formaldehyde present finds a value of 41.9.

*Example 2*

A 10-6-4-grade mixed fertilizer is prepared as in Example 1. The ammoniating solution and sulfuric acid, in the same concentrations as in Example 1, are premixed in a 25-gallon stainless steel enclosed pot having two inlets and one outlet. The sulfuric acid and ammoniating solution are fed separately into these inlets in such proportions that the pH in the pot is maintained above 7. They are also fed in such a fashion that a vortex is created inside the pot which thoroughly co-mingles the reactants. The mixed, reacted solution is then fed, at a rate of 22 gallons per minute, from the pot into the inlet side of the ammoniator, where it is thoroughly mixed with the solid fertilizer ingredients.

The product is then dried, screened and cooled as in Example 1, after which it is bagged and sold. It is found to have an activity index for the urea-formaldehyde present of 41.7.

The embodiments of the invention in which an exclusive property or privilege is claimed are:

1. A process for making a mixed fertilizer containing urea-formaldehyde polymer having an activity index in excess of 40, said process comprising premixing in a closed container a fertilizer ammoniating solution containing urea and a source of formaldehyde with an acid selected from the group consisting of sulfuric acid in an amount sufficient to produce a mixture having a pH value in the range of 6.8 to 11 and phosphoric acid in an amount sufficient to produce a mixture having a pH value in the range of 6 to 6.5, and subsequently adding said premixed solution to dry fertilizer ingredients to produce a mixture having a pH value in the range 5.2 to 6.2, said dry fertilizer ingredients having included therein a preformed solid urea-formaldehyde polymer prior to the addition of said premixed solution.

2. The process of claim 1 wherein the premixing is accomplished by co-mingling turbulent streams of the reactants.

3. A process as defined in claim 1 wherein sulfuric acid is premixed with the ammoniating solution in an amount sufficient to produce a mixture having a pH value in the range 6.8 to 11.

4. A process as defined in claim 1 wherein phosphoric acid is premixed with the ammoniating solution in an amount sufficient to produce a mixture having a pH value in the range 6 to 6.5.

References Cited by the Examiner

UNITED STATES PATENTS

| | | | |
|---|---|---|---|
| 1,893,437 | 1/1933 | Ober et al. | 71—37 |
| 2,255,026 | 9/1941 | Keenen et al. | 71—30 |
| 2,502,996 | 4/1950 | Rohner | 71—30 |
| 2,592,809 | 4/1952 | Kralovec et al. | 71—28 |
| 2,618,546 | 11/1952 | Davenport | 71—28 |
| 2,644,806 | 7/1953 | Kise | 71—28 |
| 2,766,283 | 10/1956 | Darden | 71—28 |
| 2,955,930 | 10/1960 | Kealy | 71—29 |

DONALL H. SYLVESTER, *Primary Examiner.*

ANTHONY SCIAMANNA, *Examiner.*